No. 881,771. PATENTED MAR. 10, 1908.
H. CAIN.
MIRROR FOR MOTOR VEHICLES.
APPLICATION FILED FEB. 21, 1907.

2 SHEETS—SHEET 1.

WITNESSES:
W. M. Avery
C. W. Fairbank

INVENTOR
Henri Cain
BY Munn & Co.
ATTORNEYS

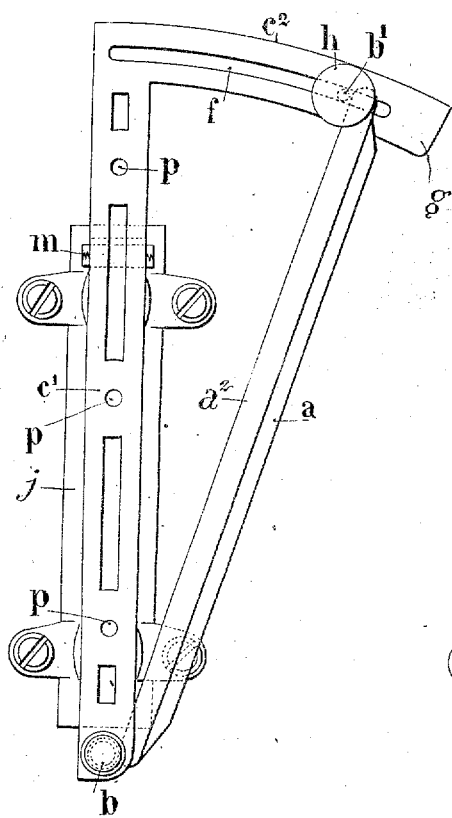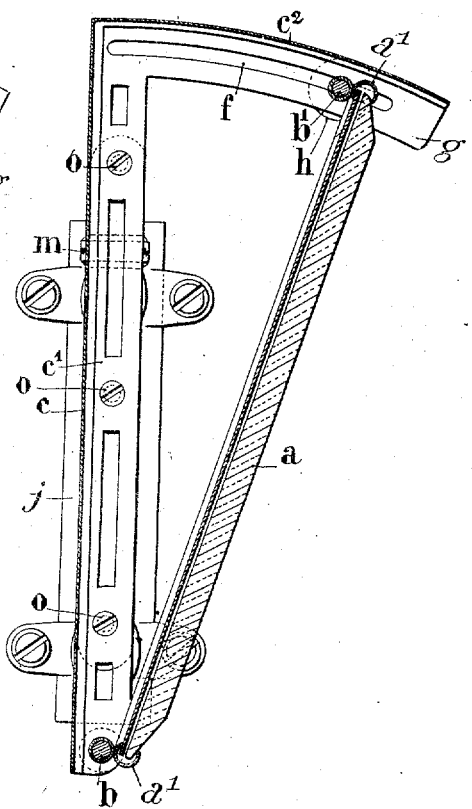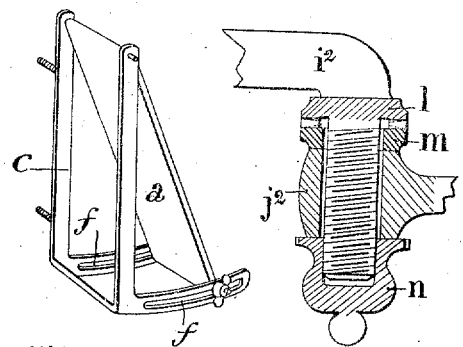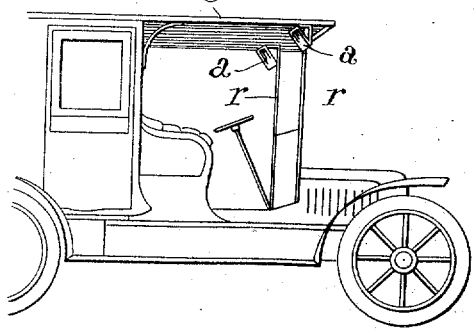

UNITED STATES PATENT OFFICE.

HENRI CAIN, OF PARIS, FRANCE

MIRROR FOR MOTOR-VEHICLES.

No. 881,771.　　　　Specification of Letters Patent.　　Patented March 10, 1908.

Application filed February 21, 1907. Serial No. 358,557.

*To all whom it may concern:*

Be it known that I, HENRI CAIN, a citizen of the Republic of France, and a resident of Paris, France, have invented a new and Improved Mirror for Motor-Vehicles, of which the following is a full, clear, and exact description.

This invention relates to certain improvements in mirrors for use on motor vehicles, whereby the chauffeur may see the road behind the vehicle, and, at the same time, the road in front.

The invention relates more particularly to the special means for mounting the mirror so that it takes up the minimum amount of space and does not detract from the appearance of the vehicle.

The invention consists in certain features of construction and combination of parts, all of which will be fully set forth hereinafter and particularly pointed out in the claims.

Reference is to be had to the accompanying drawings forming a part of this specification, in which similar characters of reference indicate corresponding parts in all the figures, and in which—

Figure 1:
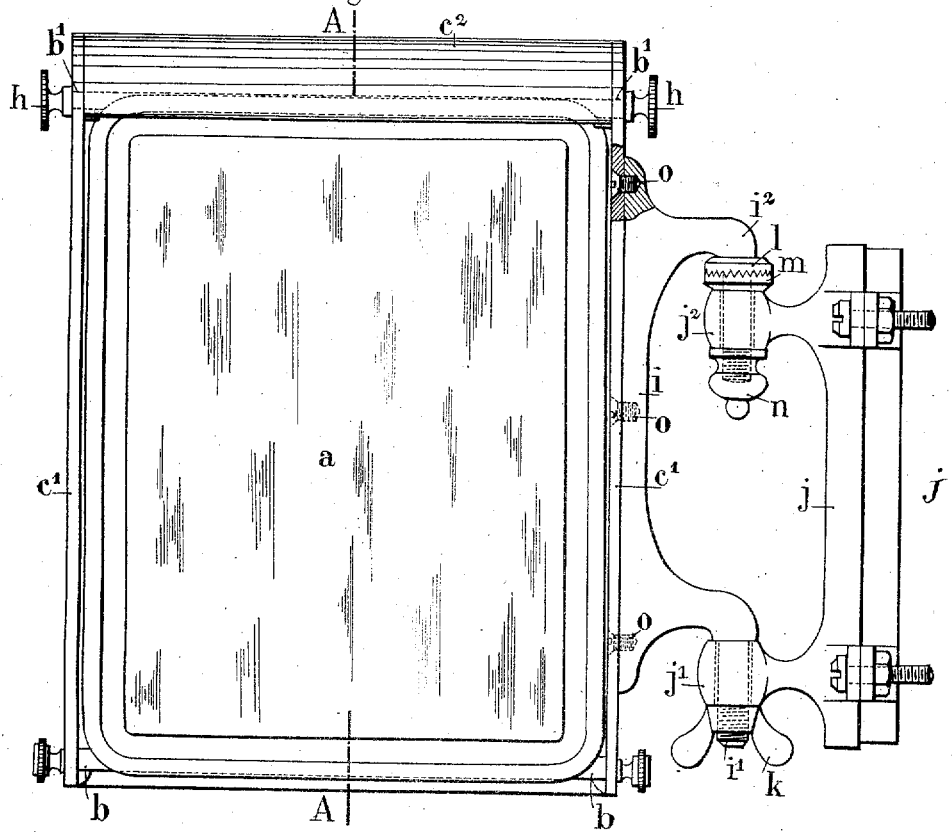
Figure 2:
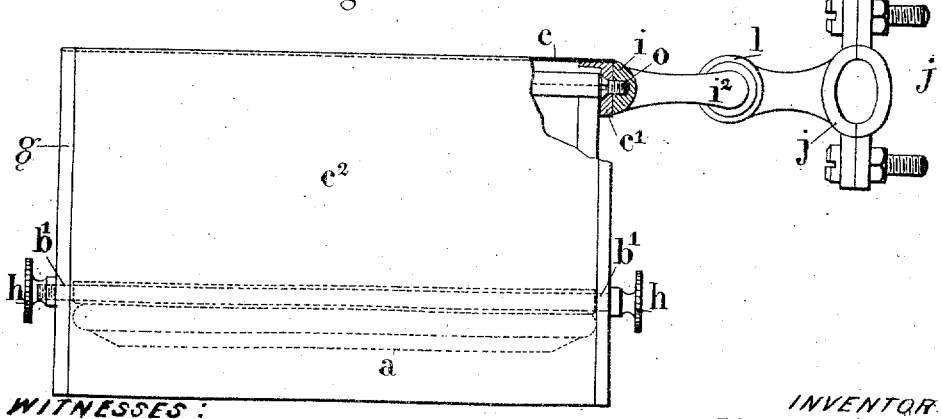

Figure 1 is a front elevation of one form of my improved device; Fig. 2 is a plan view thereof; Fig. 3 is a side view; Fig. 4 is a vertical section taken on the line A—A of Fig. 1; Fig. 5 is a detail view showing a portion of the supporting means; Fig. 6 is a perspective view illustrating a modified form of supporting means; and Fig. 7 is a perspective view of a motor vehicle provided with my improved mirror.

My improved mirror is adapted for use in connection with any form of vehicle, but is especially adapted for attachment to one of the uprights adjacent the canopy, as illustrated in Fig. 7. The mirror $a$ is made up of any suitable form, but is preferably rectangular and is illustrated as being of beveled plate glass. The mirror is surrounded by a tubular metal frame $a'$ having a slot therein into which the mirror proper and the back $a^2$ extend, the frame serving to hold the mirror and back in engagement with each other. This frame at its lower end is connected to a horizontally-disposed rod $b$, and at its upper end to a second and similar rod $b'$. The rod $b$ is so mounted that it may rotate, while the rod $b'$ is so mounted that it may be moved laterally to permit of the rotation of the mirror about the first mentioned rod. The supporting means for these rods preferably comprise a vertically-disposed supporting plate $c$ of sheet metal or other similar material and rigidly secured to a suitable rectangular frame $c'$. The upper end of this frame is provided with brackets $g$ which support the cover $c^2$, and each bracket is provided with a curved slot $f$, in which slides the previously mentioned rod $b'$. The slot $f$ lies in the arc of a circle having the rod $b$ as a center, whereby the rod $b'$ may be moved laterally within said slot and the inclination of the mirror varied at will. The cover $c^2$ protects the rod and prevents the accumulation of foreign matter in the back of the mirror so as to interfere in any way with the free movement thereof. For locking the mirror at the desired angle, I provide the ends of the rod $b'$ with thumb nuts $h$ adapted to frictionally engage with the sides of the brackets $g$ and bind the rod in place.

The device above described may be attached to the vehicle in any suitable manner, but preferably I provide clamping members $j, j$, adapted to encircle an upright of the vehicle and be rigidly secured thereto in any suitable manner. One of these clamping members $j$ carries, preferably integrally therewith, sockets $j', j^2$ having passages therethrough in alinement with each other for the reception of spindles $i', i^2$ carried by the mirror frame. The side of the mirror frame is provided with a series of perforations $p$ through each of which extends a small screw $o$, and by means of these screws I secure in place a bracket member $i$ having integrally therewith the spindles $i'$ and $i^2$. The spindle $i^2$ is preferably provided with an outwardly-extending flange $l$ having downwardly-extending teeth thereon, and these teeth are adapted to engage with upwardly-extending teeth on a collar $m$ carried by the socket $j^2$. The spindles are held from free rotation in the socket members by means of said teeth, and when the mirror has been set at the desired angle in respect to the clamping members $j$, I secure in place suitable nuts $k$ and $n$ upon the lower ends of the spindles to prevent their vertical displacement and the disengagement of the teeth on the flange $l$ with those on the collar $m$. The mirror and its frame are thus positively locked in position, and at the angle best suited to permit of a ready inspection of the road behind the vehicle by the driver or other occupants of the car.

It is evident that the mirror frame and support may be made in various artistic shapes or designs and constitute an ornament or decoration to the vehicle.

For obtaining the desired inclination of the mirror, it is evident that it may be pivoted at the top and swing at the lower end rather than pivoted at the bottom, and in Fig. 6 I have illustrated somewhat diagrammatically, a frame adapted to so support the mirror. The entire device may be attached to any portion of the vehicle desired, but it preferably extends outward from adjacent one side thereof and at such an elevation as to not interfere in any way with the free entrance or exit from the vehicle. In Fig. 7 I have illustrated two mirrors secured to the uprights $r$ which support the canopy or top $e$, although it is evident that they may be secured to other parts of the vehicle if desired.

Having thus described my invention, I claim as new and desire to secure by Letters Patent:

1. A device for use in connection with motor vehicles, comprising a mirror having a frame surrounding the same, a bracket having a curved slot therein, a member carried by said mirror and extending through said slot, means for pivotally supporting the opposite end of the mirror, and means carried by said bracket for securing the same to a portion of the vehicle.

2. A device for use in connection with vehicles, comprising clamping members, sockets carried by one of said members, a mirror, a supporting frame, means for pivotally supporting one end of said mirror within said frame, means for adjustably mounting the opposite end of said mirror within said frame, and means carried by said frame and fitting within sockets for adjusting the position of the mirror and frame.

3. A device for use in connection with vehicles, comprising a supporting frame, brackets carried thereby having curved slots therein, a mirror, means for pivotally securing said mirror within said frame, means carried by said mirror and in engagement with said slots for adjusting the inclination of the mirror, clamping members adapted to be secured to a portion of the vehicle, sockets carried by one of said members, means carried by said supporting frame and in engagement with said sockets whereby the position of the frame and mirror may be adjusted, and means adapted to prevent accidental displacement of the frame with respect to the clamping members.

HENRI CAIN.

Witnesses:
HARRY A. LYONS,
OTTO CORNIER.